United States Patent [19]

Weschenfelder

[11] Patent Number: 5,438,757

[45] Date of Patent: Aug. 8, 1995

[54] MULTIFUNCTION CUTTING TOOL

[76] Inventor: Sonja Weschenfelder, Stettiner Str. 7, 76694 Forst, Germany

[21] Appl. No.: 310,518

[22] Filed: Sep. 22, 1994

[51] Int. Cl.[6] ............... B26B 11/00; B26B 27/00; C03B 33/12
[52] U.S. Cl. ..................... 30/139; 30/164.95; 30/294; 30/310; 7/103; 7/158
[58] Field of Search ............ 30/123, 138, 139, 246.1, 30/329, 164.95, 294, 310; 7/118–120, 103, 168, 167, 158

[56] References Cited

U.S. PATENT DOCUMENTS 3,839,792 10/1974 Ceccon ........................... 30/310

FOREIGN PATENT DOCUMENTS 0489290 6/1992 European Pat. Off. .

Primary Examiner—Douglas D. Watts

[57] ABSTRACT

A multifunction cutting tool includes a cutting head adjustable for straight, free form or circular cutting of glass and tile, interchangeably mountable hobby and hook blades for cutting carpet, PVC, matting and the like, a roller cutter for cutting cloth, wallpaper, leather and similar sheet material, knife and scissor sharpeners and an angled carpet cutter blade mounted in a carriage with a base plate for sliding under the carpet. The tool has blade guards to protect the user from accidental injury and brackets supporting the cutting blades that are stabilized by resilient snap fittings and laterally extending support shoulders. Access to retractable folding hobby and hook blades is improved by the addition of screwdriver tip receiving pivot slots in the blades and the work surface of circular cuts is protected by a suction cup having a recessed and covered metal attachment.

4 Claims, 3 Drawing Sheets

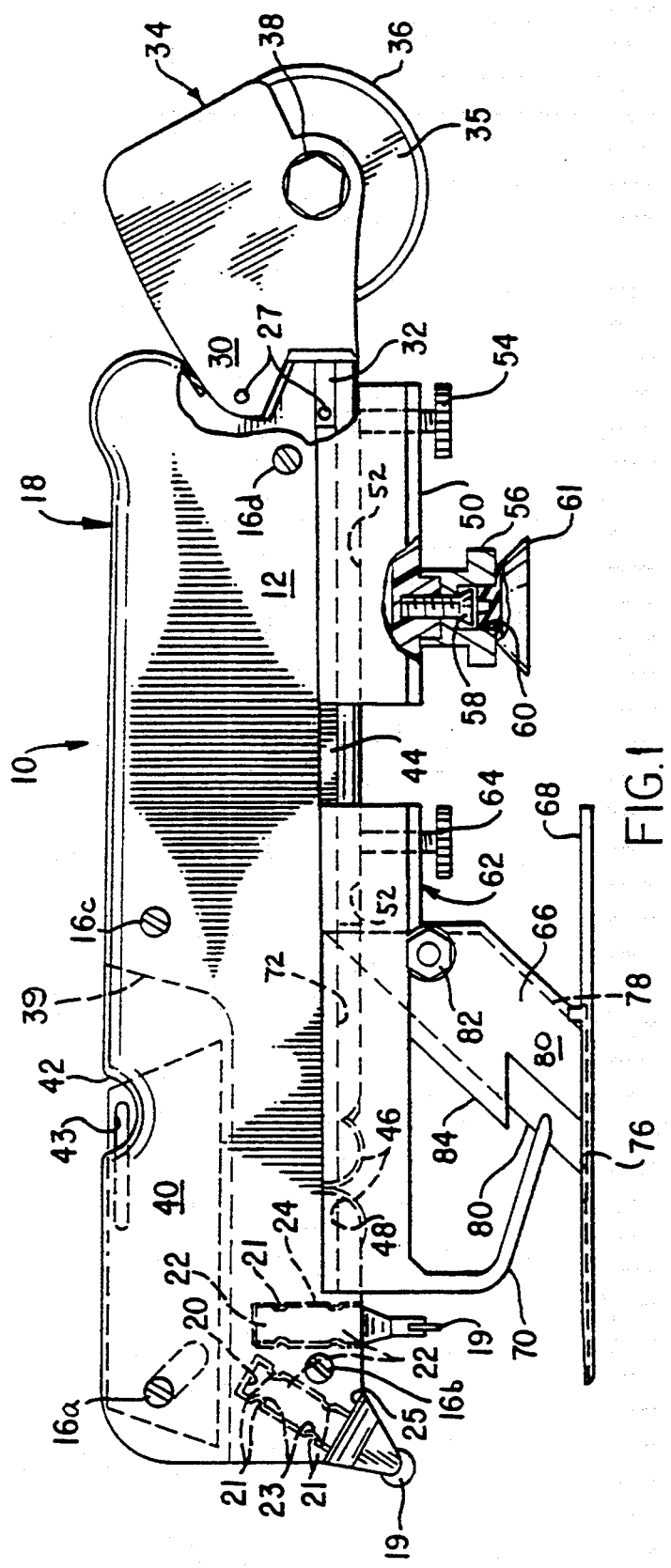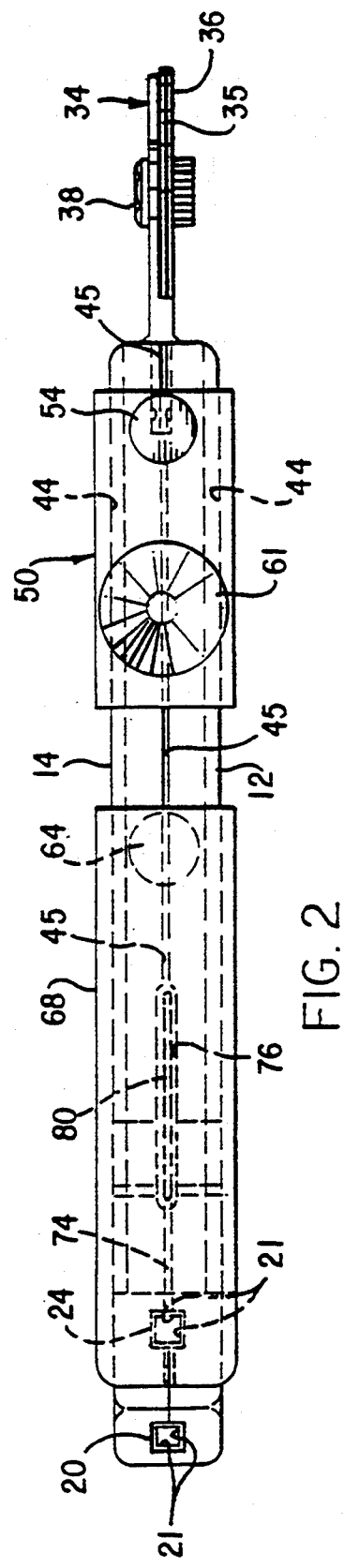

MULTIFUNCTION CUTTING TOOL

BACKGROUND OF THE INVENTION

1. Technical Field

The present invention pertains to cutting tools and more particularly to handheld multifunction cutting tools having roller cutters, circle cutters for glass and tile, and a protected carpet cutting blade.

2. Discussion of the Prior Art

Multifunction cutting tools of various sorts are well known in the art. One example, described in European Patent No. 489,290 (Weschenfelder) incorporated herein by reference, includes the following features: a first small roller head for glass and tiles; a hobby blade for carpet, PVC and matting as well as cable stripping; a hook blade for carpet, PVC, rubber and plastic; a second large roller head for cloth, wallpaper, leather, etc.; both scissors and knife sharpening grooves; a suction-cup pivot foot used with the first roller head for cutting circles in glass and tiles; and a carpet attachment carrying an angled blade and having a foot for sliding under carpet to produce smooth cuts therein.

As successful as these tools have been, certain drawbacks have limited their utility in some areas. The carpet attachment angled blade is exposed from the foot to the tool potentially creating a potential hazard to users. The large roller blade is held in position in the tool by two extensions, extending from a bracket received in the tool handle and snapped into place by a detent on the lower extension. This attachment, in some applications, is insufficiently rigid. The suction cup is attached to the pivot foot via a metal machine screw extending upward through the bottom of the rubber suction cup. This poses a risk of scratching the material being cut. The hobby blade and hook blade each rotate into the tool body and are difficult to retrieve. Finally, the mounting bracket supporting the small glass-cutting roller head is rectangular in cross-section and slides into a receiving channel in the body, yet lacks a solid abutment surface to brace against the body and thus lacks stability under pressure.

OBJECTS AND SUMMARY OF THE INVENTION

It is an object of the present invention to improve the safety of the original Weschenfelder multifunction cutting tool.

It is a further object of the present invention to improve the stability of the large roller blade of the Weschenfelder multifunction cutting tool.

It is another object of the present invention to prevent the suction cup assembly of the Weschenfelder cutting tool from scratching working surfaces.

It is yet another object of the present invention to simplify the retrieval of hobby and hook blades rotatably stored within the body of the Weschenfelder tool by pivoting the blade with the point of a screwdriver.

Another object of the present invention is to improve the stability of the glass cutting roller blade in the Weschenfelder tool.

In accordance with the present invention the Weschenfelder multifunction cutting tool is provided with a protective guard to shield the upper portion of the carpet attachment blade, a second snap fit attachment point on the large roller blade bracket to engage the tool body, a friction-fit attachment for securing the suction cup to the body, accessible slots in the backs of the hobby and hook blades for pivoting with a screwdriver, and an outwardly extending wedge-shaped shoulder on the glass cutting roller blade mounting bracket to abut solidly against the tool body.

The above and still further objects, features and advantages of the present invention will become apparent upon considering the following detailed description of specific embodiments thereof, particularly when viewed in conjunction with the accompanying drawings wherein like reference numbers in the various figures are used to designate like components.

BRIEF DESCRIPTION OF THE DRAWINGS

FIG. 1 is a side view in elevation of a multifunction cutting handtool according to the Weschenfelder design having improvements according to the present invention.

FIG. 2 is a bottom view in plan of a multifunction cutting tool having improvements according to the present invention.

DESCRIPTION OF THE PREFERRED EMBODIMENTS

Figure 4:
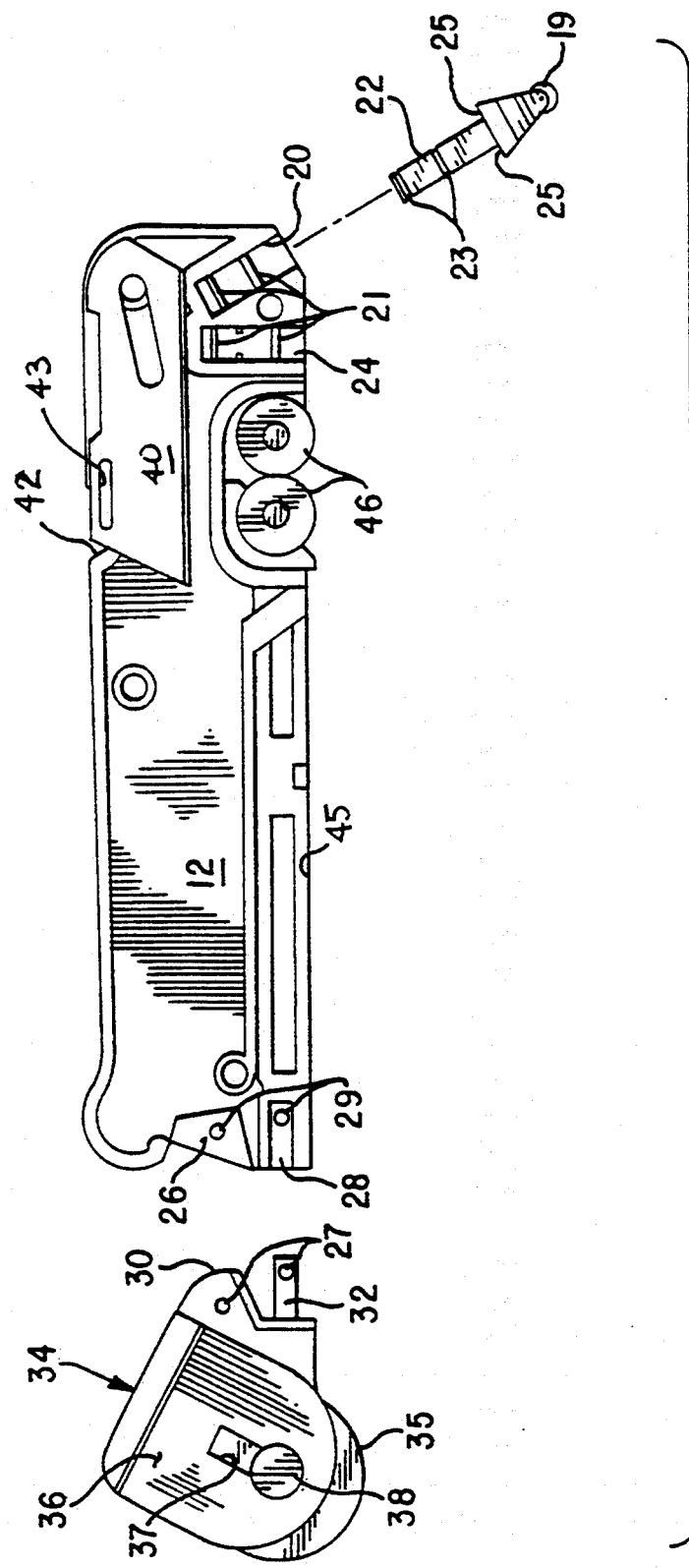
FIG. 4 is a side elevation view of the inside of one tool body half with the glass cutter bracket and rotatable cutting blade bracket exploded.

Referring to FIGS. 1-4, the multifunction cutting tool 10 has first and second tool body or housing shell halves 12 and 14, respectively, held together along the centerline plane by, for instance, machine screws 16a, 16b, 16c and 16d, to form the tool handle 18. A first recess 20 having a rectangular cross-section is formed in the front end of tool handle 18 to receive a mounting bracket 22 for a glass cutter blade 19 in a snap fit at a forwardly tilted angle with the blade aligned with the tool long axis. A second recess 24 is formed behind the first recess 20 to alternatively receive bracket 22 in a snap fit so as to be oriented perpendicularly downward relative to the tool handle with the blade aligned perpendicular to the tool long axis. Recesses 20 and 24 have ribs 21 formed to resiliently receive grooves 23 defined on bracket 22. Bracket 22 flairs outward from the rectangular cross-section extending into recesses 20 or 24 to a pyramid or wedge shape with laterally extending shoulders 25 formed to abut the flat surface of handle 18 and provide additional support and stability.

Figure 7:
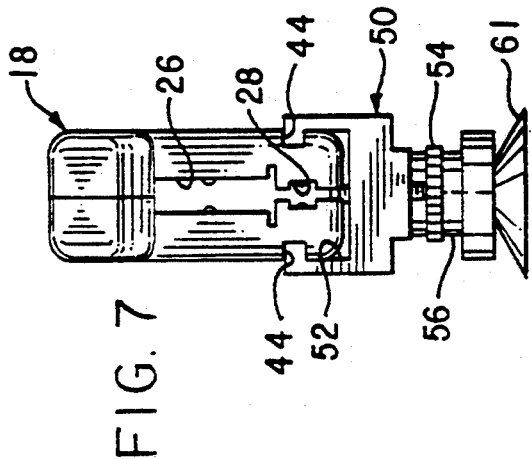
FIG. 7 is a back view in elevation of a multifunction cutting tool with the suction cup carriage attached.

Upper and lower rectangular orifices 26 and 28, respectively, shown in FIGS. 4 and 7, are formed in the back end of handle 18 for receiving an upper and lower arm, 30 and 32, respectively, of a bracket 34 carrying a large diameter rotatable cutting blade 35 and a blade guard 36 slidably mounted in slot 37 on axis bolt 38. Indentations 27 formed along the lateral surfaces of both the upper and lower arms 30 and 32, respectively, resiliently receive protrusions 29 formed along the lateral surfaces of upper and lower orifices 26 and 28, respectively.

Figure 5:
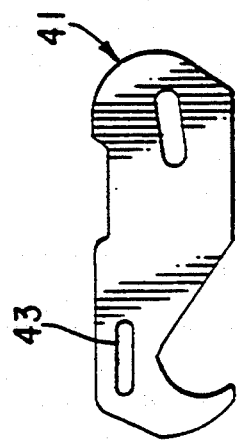
FIG. 5 is a side view in elevation of a hook blade for a multifunction cutting tool having a pivot slot according to the present invention.
Figure 3:
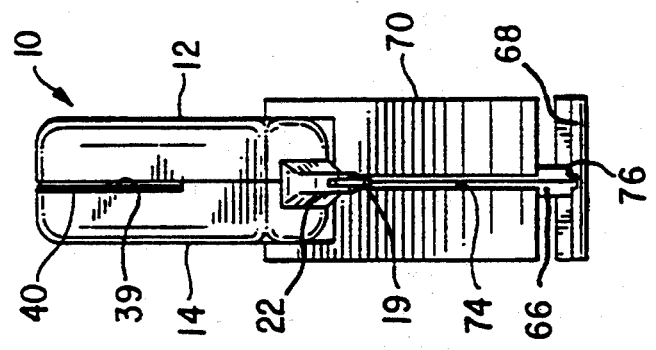
FIG. 3 is a front view in elevation of a multifunction cutting tool having improvements according to the present invention.

A narrow slot 39 is defined in the upper surface of handle 18 for retractably receiving a hobby blade 40 or, alternatively, a hook blade 41 shown in FIG. 5, pivotally mounted in the handle by a machine screw 16a. A lateral cavity 42 formed in tool handle 18 allows access to a slot 43 defined in hobby blade 40, or hook blade 41 to receive the tip of a screwdriver.

Longitudinal guide slots 44 are defined along the lower portion of each body shell half 12 and 14 from the rearward end of the tool to a point near the longitudinal location of second recess 24. An upwardly extending slot 45 is formed along the center of the handle bottom from the rear to a point approximately midlength of the tool. Sharpening wheels 46 are mounted rotatably along the center of the handle lower portion, extending partially below the handle bottom, at a longitudinal location between the forwardmost extent of slot 45 and second recess 24. A lateral slot 48 is formed in the tool body between wheels 46 to permit insertion of tools to be sharpened against the wheels.

Figure 6:
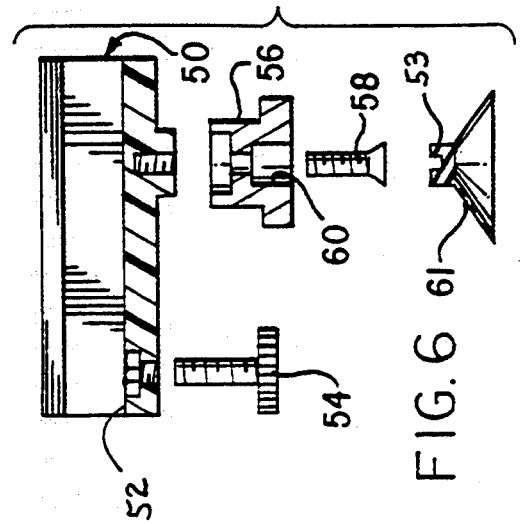
FIG. 6 is an exploded side elevation view of the suction cup carriage.

A first carriage 50, shown in FIGS. 6 and 7, having a cross-section defining an upwardly open channel 52 sized to slide longitudinally along guide slots 44, has a set screw 54 extending upward from the bottom side, passing through carriage 50 to lockingly engage the bottom of handle 18. A bracket 56 is rotatably attached to the bottom of first carriage 50 by a machine screw 58 recessed in cylindrical orifice 60 defined in the bottom of bracket 56. A resilient suction cup 61 has a cylindrical top member 59 sized to snap fit into orifice 60.

A second carriage 62, formed of upwardly open channel 52 sized to slide along guide slots 44, has set screw 64 extending upwardly through carriage 62 to lock the carriage in position against handle 18. A forwardly angled crosspiece 66 extends downward from carriage 62 to a flat longitudinally extending foot 68 parallel to the handle bottom. Guide arm 70 extends downward from the front portion of second carriage 62 to a point about midway between the carriage and foot 68, then angles downward toward the back, extending almost to crosspiece 66. A through-slot 72 extends along the center of carriage 62 from a position in front of set screw 64 to the front end of carriage 62. A second through-slot 74 separates guide arm 70 into two halves. A slot 76 is defined in the upper surface of foot 68 from the crosspiece 66 to the front of the foot, and crosspiece 66 has a slot 78 defined along the rear side.

A trapezoidal carpet blade 80 fits sharp edge frontwards between the two halves of guide arm 70 with blade back within crosspiece slot 78, the blade lower side in foot slot 76 and blade upper side extending through carriage slot 72 into handle slot 45. A bolt 82 passes laterally through slotted crosspiece 66 and through a hole in blade 80 to hold and lock blade 80 rigidly in place. Blade guards 84 extend from one or both sides of crosspiece 66 beyond the blade sharp edge from just above the arm 70 to the carriage bottom to afford protection for the blade and the user.

In use carriages 50 and 62 are generally not attached to the tool body 18 unless required for a particular cutting application. To perform straight or freehand cuts on glass, tiles, mirrors, safety glass, windows and aquarium glass up to about ½ inch thick, machine screws 16a and 16b are loosened and glass cutter mounting bracket 22 is inserted into angled recess 20. The screws are re-tightened and a drop of oil is applied to the cutting head blade 19, the blade is pressed against the workpiece and the tool is drawn along the line of the desired cut to score the material. Gentle downward pressure on both sides of the score line is used to snap out the cut.

To cut carpet, PVC and matting and to strip cable, the hobby blade 40 is used. To retrieve blade 40 from storage slot 39 machine screws 16a and 16c are loosened and the tip of a screwdriver or other similarly shaped tool is inserted into lateral cavity 42 and through slot 43 in the blade. The blade is rotated around pivot screw 16a to an extended position and the screws are retightened to lock the blade in place for use as a typical utility knife. To strip insulation from cable, blade 40 is rotated away from cavity 42, cable is laid in the cavity and the blade is rotated back into the cable. Either the cable or the tool is rotated through a full turn to score the insulation, which is then broken and removed. A sharp pressure can be exerted on the blade to cut the cable laid through cavity 42.

For some cutting applications on carpet, PVC, rubber and plastic, the hook blade 41 replaces hobby blade 40. In these situations, machine screws 16a are removed, the two body shell halves 12 and 14 are loosened, blade 40 is removed and hook blade 41 is inserted instead. The handle is re-assembled and the hook blade is used in a similar fashion to the procedure previously described for hobby blade 40.

Large diameter roller cutter blade 35 is used to cut cloth, curtains, wet and dry wallpaper, sponge, cork, leather, fur, etc. Machine screw 16d is loosened and bracket arms 30 and 32 are inserted into orifices 26 and 28, respectively, and snapped resiliently into position. Protrusions 29 formed along the orifice walls engage indentations 27 formed on arms 30 and 32. Machine screw 16d is re-tightened and roller blade 35 is exposed by sliding blade guard 36 upward along slot 37 and tightening axis bolt 38 to secure the guard in place. Material is cut by exerting a downward pressure on the tool to press blade 36 into the material to be cut, then drawing the blade across the cut line. After use the guard blade is returned to a position protecting the sharp edge of blade 36.

Scissors and knives are sharpened by drawing the blade to be sharpened through V-groove 48 while exerting pressure against wheels 46.

To cut circles in glass and tile, machine screws 16a and 16b are loosened. Cutter mounting bracket 22 is withdrawn from angled recess 20 and reinserted in downwardly oriented recess 24 with cutter 19 now aligned perpendicular to the long axis of the tool, and the machine screws are retightened. Machine screw 16d is loosened and large roller assembly 34 is removed from the back end of handle 18. Machine screw 16d is re-tightened and open channel 52 of carriage 50 slides along guide slots 44 on each side of tool handle 18. Carriage 50 is positioned so that the distance between the center of suction cup 61 and cutter blade 19 is equal to the radius desired to be cut. The carriage is then locked in position with set screw 54, and the suction cup is affixed to the center of the circle to be cut. The tool is rotated a full turn while exerting a downward pressure on the cutter into the work piece. The tool is removed and the circle is removed from the remaining material by a light tap at the center. Carriage 50 can then be removed.

To neatly cut carpet, especially laid carpet, open channel 52 of carriage 62 slides into guide slots 44 with the sharp edge of carpet blade 80 facing forwardly. The carriage is positioned forward in slots 44 and locked into place with set screw 64. The forward portion of foot 68 is inserted beneath the carpet surface with guide arm 70 located above the carpet. The tool is then pushed forward to cut the carpet with the sharp edge portion of blade 80 exposed between the foot 68 and the guide arm. The remainder of the blade is shielded by guard 84 to prevent accidental cutting.

From the foregoing description it will be appreciated that the invention makes available an improved multifunction cutting tool less likely to accidently cut the user or to scratch or mar a work surface. In addition access to foldaway blades is improved and the stability of the rotatable cutting blades is enhanced.

In accordance with the present invention, it is believed that other modifications, variations and changes will be suggested to those skilled in the art in view of the teachings set forth herein. It is therefore understood that all such variations, modifications and changes are believed to fall within the scope of the present invention as defined by the appended claims.

What is claimed is:

1. A multifunction cutting handtool comprising:

a generally oblong handle having a front and a back end located on opposite ends of the long axis and an upper and a lower portion located on opposite sides of the short axis;

said handle having two opposed halves joined along a centerline plane passing through said long and short axes and fastened together by removable machine screws passing therethrough;

a generally trapezoidal cutting blade having a mounting slot defined near one end and a sharp edge along one side, said blade mounted rotatably in said handle by a removable machine screw passing through said handle halves and said mounting slot, said blade fitting in a retracted position within a recess formed along said upper portion of said handle between said halves and rotatably extendable forward of said handle for use as a cutting tool;

said handle having an access cavity defined in said upper portion permitting said blade to be grasped for rotation;

said blade having a slot defined therein aligned with said access cavity;

a first mounting bracket having a glass cutter blade rotatably mounted on a first end and sized on a second end to resiliently snap fit into a first recess formed in the front end of said handle with said glass cutter blade aligned parallel with said handle centerline plane;

a second recess on said lower portion of said handle for receiving said first mounting bracket with said glass cutter blade aligned perpendicular to said handle centerline plane;

said mounting bracket having laterally extending shoulders sized to abut against said handle;

a pair of rotatable tangential sharpening wheels mounted along said lower portion of said handle;

a second mounting bracket having a rotatable cutting blade mounted on a first end and having first and second arms defined in a second end sized to resiliently snap fit into orifices defined in the back end of said handle;

said arms having indentations defined in the lateral sides to resiliently receive protrusions formed in the walls of said orifices;

said handle having guide slots defined along the lower portion of each of said opposed halves for slidingly receiving the upper portion of open channel shaped carriages;

a first carriage slidably receivable in said guide slots having a set screw for fixably attaching said first carriage to said handle and a bracket rotatably mounted to said first carriage on a first end and having a suction cup attached to a second end;

said suction cup having a cylindrical top member sized to snap fit into an orifice formed in said first carriage bracket second end;

a second carriage slidably receivable in said guide slots having a set screw for fixably attaching said second carriage to said handle, a crosspiece angled forward and down from said second carriage to a flat foot extending parallel to said handle lower portion and a guide arm extending down from said second carriage toward said foot;

a generally trapezoid carpet blade mounted in said cross-piece with a cutting edge extending forward of said crosspiece from said second carriage to said foot; and a blade guard extending forward of said carpet blade from said carriage to a position near said foot.

2. The multifunction cutting handtool of claim 1 further comprising a hook blade interchangeably attachable with said trapezoidal cutting blade having a slot defined therein aligned with said access cavity.

3. In a multifunction cutting handtool having a handle, a folding knife, glass cutter and roller cutter fitted into said handle, at least one guide slot extending lengthwise along said handle, a first carriage configured to be lockably slidable along said at least one slot; said first carriage having a rubber suction cup rotatably attached to the lower surface thereof by a metal screw, said screw secured to said first carriage bottom by a nut, a second carriage configured to be lockably slidable along said at least one slot, said second carriage having a downwardly inclined crosspiece and a slide block attached to the lower end of said crosspiece, and an interchangeable trapezoidal cutting blade fitted into said slide block, the method comprising the steps of:

attaching said suction cup to said first carriage via a resilient friction fit to eliminate the possibility of said metal screw scratching the support surface;

forming a slot in said folding knife for receiving the tip of a screwdriver permitting said knife to be rotated away from said handle with said screwdriver;

providing a blade shield extending partially along said downwardly inclined crosspiece protectively shielding the sharp upper portion of said cutting blade.

4. In the multifunction cutting handtool of claim 3 having a hook blade interchangeably attachable with said folding knife blade, the improvement comprising:

forming a slot in said hook blade for receiving the tip of a screwdriver permitting said hook blade to be rotated away from said handle with said screwdriver.

* * * * *